United States Patent
Kjærgaard et al.

(10) Patent No.: US 11,725,628 B2
(45) Date of Patent: Aug. 15, 2023

(54) CONTROL OF A POWER PLANT WITH AT LEAST ONE WIND TURBINE

(71) Applicant: VESTAS WIND SYSTEMS A/S, Aarhus N (DK)

(72) Inventors: Jacob Barsøe Kjærgaard, Hinnerup (DK); Steve Jessen, Risskov (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 97 days.

(21) Appl. No.: 17/252,644

(22) PCT Filed: May 27, 2019

(86) PCT No.: PCT/DK2019/050166
§ 371 (c)(1),
(2) Date: Dec. 15, 2020

(87) PCT Pub. No.: WO2019/238184
PCT Pub. Date: Dec. 19, 2019

(65) Prior Publication Data
US 2021/0254599 A1  Aug. 19, 2021

(30) Foreign Application Priority Data

Jun. 15, 2018 (DK) .......................... PA 2018 70406

(51) Int. Cl.
*F03D 7/04* (2006.01)
*F03D 7/02* (2006.01)
(Continued)

(52) U.S. Cl.
CPC ............ *F03D 7/048* (2013.01); *F03D 7/028* (2013.01); *F03D 9/257* (2017.02); *H02J 3/381* (2013.01);
(Continued)

(58) Field of Classification Search
CPC .......... F03D 7/028; F03D 9/257; F03D 7/048; F05B 2270/1033; F05B 2270/335
See application file for complete search history.

(56) References Cited

U.S. PATENT DOCUMENTS 8,890,505 B2 * 11/2014 Forbes, Jr. ............. G06Q 10/00
    700/297
9,130,402 B2 * 9/2015 Forbes, Jr. ................ H02J 3/00
(Continued)

FOREIGN PATENT DOCUMENTS

EP      2921699 A1     9/2015
WO  2018006920 A1     1/2018
(Continued)

OTHER PUBLICATIONS

Danish Patent and Trademark Office 1st Technical Examination Report for Application No. PA 2018 70406 dated Dec. 17, 2018.
(Continued)

*Primary Examiner* — Tulsidas C Patel
*Assistant Examiner* — Thomas K Quigley
(74) *Attorney, Agent, or Firm* — Patterson + Sheridan, LLP

(57) ABSTRACT

The invention relates to a method for controlling power generation of a power plant which comprises power generating units including a wind turbine. At least one power unit is operated in a non-controlled mode with a non-curtailed power set-point, and at least one other power unit is operated in a controlled mode with a curtailed power set-point. Positive capabilities are determined as the difference between the available power and the curtailed power production. The total positive capability is determined as the sum of positive capabilities. The proportion of the power units intended to be operated in the non-controlled mode is determined as a function of the total positive capability. Dependent on the difference between the determined pro-
(Continued)

portion and an actual proportion the status from non-controlled mode to controlled mode, or vice versa, of one or more of the power units is changed.

18 Claims, 4 Drawing Sheets

(51) Int. Cl.
  *F03D 9/25*  (2016.01)
  *H02J 3/46*  (2006.01)
  *H02J 3/38*  (2006.01)

(52) U.S. Cl.
  CPC ......... *H02J 3/466* (2020.01); *F05B 2200/11* (2013.01); *F05B 2220/706* (2013.01); *F05B 2270/1033* (2013.01); *F05B 2270/335* (2013.01); *H02J 2203/20* (2020.01); *H02J 2300/28* (2020.01)

(56) References Cited

U.S. PATENT DOCUMENTS

| | | | | |
|---|---|---|---|---|
| 9,513,650 | B2* | 12/2016 | Larsson | H02J 3/1828 |
| 9,651,973 | B2* | 5/2017 | Forbes, Jr. | H02J 9/005 |
| 10,295,969 | B2* | 5/2019 | Forbes, Jr. | H02J 3/00 |
| 10,396,592 | B2* | 8/2019 | Forbes, Jr. | H02J 9/005 |
| 10,770,899 | B2* | 9/2020 | Sheble | H02J 3/14 |
| 10,968,891 | B2* | 4/2021 | Gupta | H02J 3/381 |
| 10,998,732 | B2* | 5/2021 | Reddy | H02K 7/1815 |
| 11,108,263 | B2* | 8/2021 | Forbes, Jr. | H02J 13/00007 |
| 11,128,141 | B2* | 9/2021 | Marchegiani | H02J 3/38 |
| 11,264,805 | B2* | 3/2022 | Jiang | H02J 3/008 |
| 2011/0118892 | A1 | 5/2011 | Mayor et al. | |
| 2012/0226384 | A1* | 9/2012 | Forbes, Jr. | G06Q 10/00 700/291 |
| 2012/0239219 | A1* | 9/2012 | Forbes, Jr. | H02J 9/061 700/295 |
| 2012/0245753 | A1* | 9/2012 | Forbes, Jr. | H02J 3/003 700/295 |
| 2014/0103652 | A1 | 4/2014 | Ubben et al. | |
| 2015/0039149 | A1* | 2/2015 | Forbes, Jr. | H02J 3/003 700/295 |
| 2015/0159626 | A1 | 6/2015 | Tarnowski | |
| 2015/0267683 | A1* | 9/2015 | Ubben | F03D 7/048 290/44 |
| 2015/0380937 | A1* | 12/2015 | Forbes, Jr. | H02J 3/00 700/295 |
| 2016/0077507 | A1* | 3/2016 | Sheble | G06Q 50/06 700/295 |
| 2016/0370819 | A1* | 12/2016 | Forbes, Jr. | H04Q 9/00 |
| 2017/0250567 | A1* | 8/2017 | Forbes, Jr. | H02J 3/14 |
| 2017/0335824 | A1* | 11/2017 | Gupta | H02J 3/0012 |
| 2019/0271955 | A1* | 9/2019 | Forbes, Jr. | H02J 3/00 |
| 2019/0288516 | A1* | 9/2019 | Peloso | H02J 15/00 |
| 2019/0341781 | A1* | 11/2019 | Marchegiani | H02J 3/46 |
| 2020/0052523 | A1* | 2/2020 | Forbes, Jr. | H02J 3/003 |
| 2020/0303925 | A1* | 9/2020 | Reddy | G05F 1/66 |
| 2021/0044117 | A1* | 2/2021 | Jiang | G05B 19/042 |
| 2021/0384758 | A1* | 12/2021 | Forbes, Jr. | G05F 1/66 |
| 2022/0220938 | A1* | 7/2022 | Nayebi | F03D 7/048 |

FOREIGN PATENT DOCUMENTS

| | | |
|---|---|---|
| WO | 2018006921 A1 | 1/2018 |
| WO | 2019238184 A1 | 12/2019 |

OTHER PUBLICATIONS

PCT Notification of Transmittal of the International Search report and the Written Opinon of the International Searching Authority, or the Declaration for Application No. PCT/DK2019/050166 dated Aug. 21, 2019.

\* cited by examiner

CONTROL OF A POWER PLANT WITH AT LEAST ONE WIND TURBINE

FIELD OF THE INVENTION

The invention relates to control of power plants, particularly power plants which has one or more wind turbines and to determination and dispatching of power set points to the power generating units of the power plant.

BACKGROUND OF THE INVENTION

In some situations, a power plant is requested to generate power according to a certain power reference which may be reduced below the power level that the power plant is actually capable of generating. The reduction of the power level may be achieved by curtailing the power production of all power generating units equally, or by curtailing only some of the power generating elements and operating the remaining power generating elements non-curtailed.

Methods for determining which of the power generating units should be curtailed and which should be non-curtailed and particularly when a power generating unit should change status from curtailed to non-curtailed, and vice versa, may lead to undesired and non-deterministic changes in which power generating units are operated in curtailed modes and which are operated in non-curtailed modes. If the number of curtailed and thereby controllable wind turbines varies non-ideally and non-deterministic, the dynamic properties such as ramping capabilities of the curtailed wind turbines may change in an inappropriate way.

Accordingly, there is a need for a more deterministic way of determining which wind turbines should be curtailed and which should not be curtailed.

WO2018/006920A1 discloses a wind power plant having a plurality of wind turbine generators. The wind power plant supplies power to a utility grid in accordance with an active power reference such that upon a change in the active power reference the active power set point for each wind turbine generator is changed by a weighting factor. The weighting factor for an increase of the active power reference depends on a relationship between an available active power of each wind turbine generator and an available active power of the wind power plant, and wherein the weighting factor for a decrease of the active power reference depends on a relationship between a produced active power of each wind turbine generator and an aggregated active power output of the wind power plant. The invention also relates to a method for control wind power plant.

Whereas WO2018/006920A1 relates to determination and dispatching of power set-points dependent on variations in the power plant reference, the inventors of the present invention has appreciated that an improved solution is of benefit, and has in consequence devised the present invention.

SUMMARY OF THE INVENTION

It is an object of the invention to improve control of power plants to alleviate one or more of the above mentioned problems, and therefore to provide a method for determination of which power generating units that should be operated in curtailed modes more deterministic.

In a first aspect of the invention, a method for controlling power generation of a power plant is provided where the power plant comprises at least three power generating units including at least one wind turbine, where the power plant is connected to an electrical power grid for supplying power from the power generating units to the electrical power grid, and where at the power generating units are controllable to produce power dependent on individual power set-points, the method comprises:

operating the power generating units so that,
at least one power generating unit operates in a non-controlled mode with a non-curtailed power set-point, and so that
at least one other power generating unit operates in a controlled mode with a curtailed power set-point,
determining one or more positive capabilities of controlled power generating units as the difference between the available power and the curtailed power production of individual power generating units, where the available power is the maximum power that can be produced by one of the power generating units,
determining a total positive capability as the sum of the positive capabilities,
determining a proportion of the power generating units intended to be operated in the non-controlled mode, where the proportion is a real number indicating the ratio of controlled and non-controlled power generating units, and where the proportion is determined as a function of the total positive capability, and
dependent on the difference between the determined proportion and an actual proportion, change status from non-controlled mode to controlled mode, or vice versa, of one or more of the power generating units.

Herein, the available power is defined as the maximum possible power output of a wind turbine under the given wind conditions. Thus, the available power will be close to the power output according to the power optimised power curve of a specific turbine. The power curve used herein is understood as the power Coefficient (Cp) optimised power curve for the specific turbine. In other words, the power curve represents the maximum power output of a turbine under normal operation as a function of the wind speed.

Advantageously, by determining the proportion of the power generating units intended to be operated in the non-controlled mode or equivalently, the proportion of the power generating units intended to be operated in the controlled mode, as a function of the power capability, an ideal proportion is obtained. The ideal proportion provides a deterministic proportion of controlled versus non-controlled power generating units. This ideal proportion can be used as a basis for setting the control or non-control mode of the individual power generating units.

In one example, at least one of the power generating units which are controlled or non-controlled is a wind turbine. In another example, the at least one of the power generating unit which is controlled is a wind turbine and the at least one wind turbine which is non-controlled is another wind turbine.

According to an embodiment, the method comprises the method further comprises determining one or more positive capabilities of the non-controlled power generating units as the difference between the available power and the power production of individual power generating units, where the available power is the maximum power that can be produced by one of the power generating units. Advantageously, even though non-controlled power generating units may contribute with a zero value of the positive capability, with respect to the implementation of the method it may be simpler to compute the positive capabilities for all power generating units. In practice, the difference between the available power and the power production (i.e. the actual power production of a given power generating unit) may not be exactly zero, but may be substantially zero due to practical limitations of measurements and control capabilities.

According to an embodiment, the method comprises determination of one or more negative capabilities of the controlled power generating units as the difference between the curtailed power production and a minimum power production limit of individual power generating units, where the minimum power production limit is the minimum power that can be produced by one of the power generating units,
determining a total negative capability as the sum of the negative capabilities, and
determining the proportion of the power generating units intended to be operated in the non-controlled mode, where the proportion is determined as a function of the total positive capability and the total negative capability.

Advantageously, by including the total negative capability the determined proportion, i.e. ratio of controlled over non-controlled units, takes into account the need for increasing the number of controlled units as the total negative capability decreases. Thus, even though units should be moved to the group of non-controlled units due to poor positive capability, the ideal number reduces as the negative capability reduces.

According to an embodiment, the method further comprises determining one or more negative capabilities of the non-controlled power generating units as the difference between the power production and the minimum power production limit of individual power generating units, where the minimum power production limit is the minimum power that can be produced by one of the power generating units. Advantageously, inclusion of the negative capabilities of the non-controlled power generating units provides a measure of the capability to ramp power production down, e.g. in order to meet grid operator requirements.

According to an embodiment, the one or more power generating units are selected to be exposed to the change of status dependent on an operational status, the level of the positive capability or the level of the negative capabilities. Advantageously, those power generating units which contribute least to the determined proportion, e.g. units with low positive capability, low negative capability or units which have faults may be selected to be moved to the group of non-controlled units.

According to an embodiment, the change of status from non-controlled mode to controlled mode, or vice versa, for one or more power generating units is restricted according to a maximum number of power generating units which can change status within a predetermined period of time. Advantageous, in order to maintain stability in the control of the power generating units the speed of moving units from the controlled group to the non-controlled group, or vice versa, may be limited according to predetermined numbers of unit per period of time.

According to an embodiment, a rate-of-change of the function for a given variation of the total positive capability and/or the total negative capability is adjustable to provide variable changes of the proportion for the given variation of the total positive capability and/or the total negative capability.

The adjustable rate-of-change or aggressiveness, i.e. tuning of the function, enables a balance between accuracy of the power control and reducing the fluctuation of power set-points to individual units.

Other advantages of the tuning capability relates to:
The ramp rate of the units. Units in the group of controlled units that have a slow ramp rate will struggle to compensate for the units in the non-control array, thus the maximum number of units in the non-control array may need to be fewer for plants with slow ramp rate units.
Production accuracy requirements, Power plants that require a particularly high accuracy for meeting a given reference can use a more aggressively tuned algorithm to meet said accuracy, however in some cases this could cause more wear on the units. Hence, plants should be tuned as non-aggressively as possible while still allowing them to meet their required accuracy.
The fluctuation of available power. Power plants containing units that have a tendency for fast rates of change of available power (e.g. high-wind wind turbines) will need a lower maximum number of units in the non-control array compared to plants containing power generating units with a slower rate of change of available power (e.g. PV panels or low wind turbines).
Load reduction time requirements. A power plant may have a requirement to reduce power to a certain level within a certain time. Such power plants may put a higher weighting on maintaining the negative power capability, so that all units can ramp down if the need arises. Other plants may prioritize positive power capability so they can increase production faster.

According to an embodiment, the method comprises changing status from the non-controlled mode to the controlled mode of a number of the non-controlled power generating units, and at the same time, changing status from the controlled mode to the non-controlled mode of the same number of the controlled power generating units.

Advantageously, the swapping of power generating units may ensure that not only particular units are operated in the control mode, but that substantially all power generating units contribute to provide positive or negative power capabilities. As a further advantage, the swapping enables use of power generating units for the control group which are best suited at a given time.

According to an embodiment at least one of the number of the power generating units are selected to change of status from the controlled mode to the non-controlled mode dependent on an operational status, the level of the positive capability or the level of the negative capability.

Advantageously, those power generating units which contribute least to improving the park's capability, e.g. units with low positive capability, low negative capability or units which have faults may be selected to be swapped with a power generating unit from the non-controlled group which provides better performance if moved to the controlled group.

According to an embodiment, the non-controlled and controlled power generating units to be exposed to a change of status are selected dependent on a criterion to maintain, or substantially maintain, the total positive capability.

Advantageously, by maintaining the positive capability swapping of power generating units does not significantly affect the ideal proportion of controlled/non-controlled units.

According to an embodiment, the changing of status of the controlled and non-controlled power generating units comprises determining potential positive capabilities of individual power generating units of one or more of the non-controlled power generating units in a situation where they would be operated as controlled power generating units.

Advantageously, by taking into account the potential positive capability, only those power generating units which provide suitable power capabilities when moved to the control ground would be swapped with controlled power generating units.

According to an embodiment, the change of status is only possible after a predetermined period of time since the most resent change of status. This advantageously ensures that the frequency of swapping is limited.

According to an embodiment, the power plant is connected to an electrical power grid for supplying power from the power generating units to the electrical power grid in accordance with a power plant reference, where the power plant reference is set below an available park capacity causing the at least one other power generating unit to be operated in the controlled mode with a curtailed power set-point.

According to an embodiment the at least one power generating unit operating in the non-controlled mode and the least one other power generating unit operating in the controlled mode are wind turbines.

A second aspect of the invention relates to a central controller for controlling power production of a power plant which comprises at least three power generating units including at least one wind turbine, where the power plant is connected to an electrical power grid for supplying power from the power generating units to the electrical power grid, and where at the central controller is arranged to dispatch individual power set-points to the power generating units, and where the central controller is arranged to perform the method according to the first aspect.

A third aspect relates to a power plant which comprises at least three power generating units including at least one wind turbine and the central controller according to the second aspect.

A fourth aspect relates to a computer program product comprising software code adapted to control a power plant when executed on a data processing system, the computer program product being adapted to perform the method according to the first aspect.

In general, the various aspects and embodiments of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
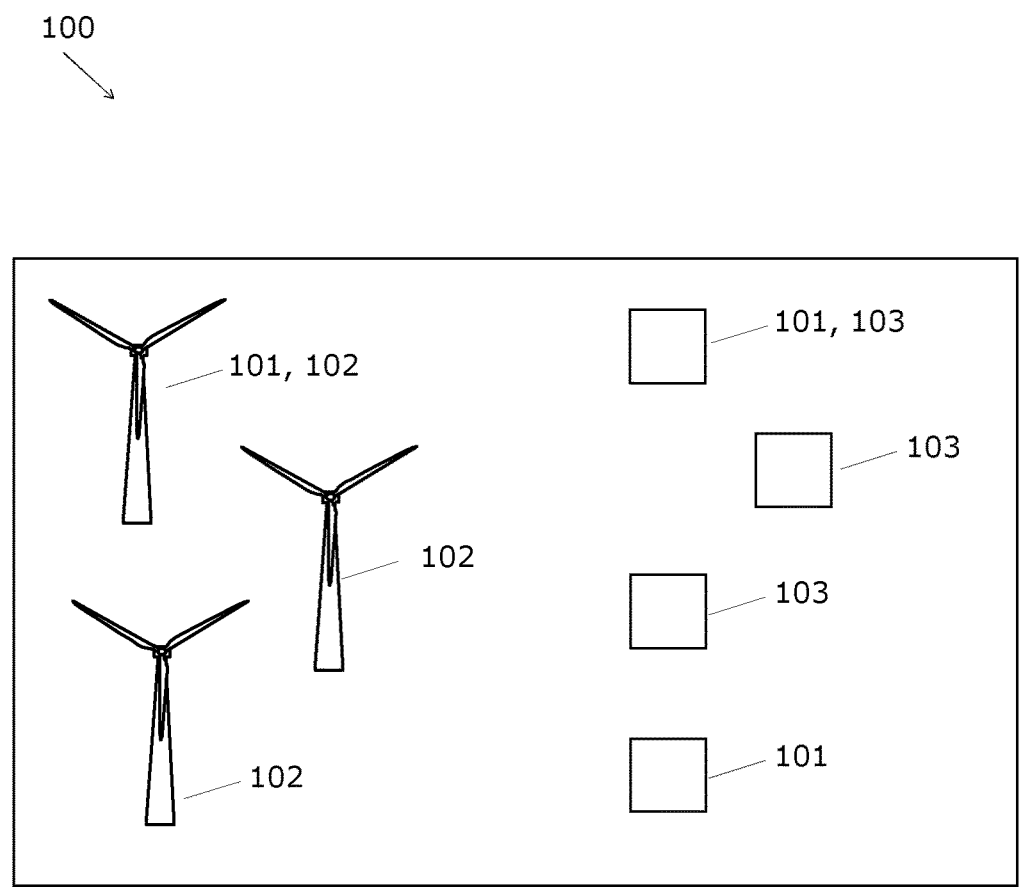
FIG. 1 illustrates a power plant.
Figure 1:
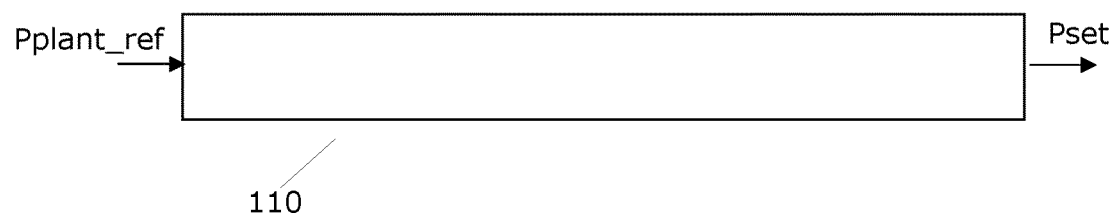

FIG. 1 shows a power plant 100 which comprises a plurality of power generating units 101 such as wind turbines. In general, the power generating units 101 may consist of different types of power generating units, e.g. different types of renewable power generating units such as solar power units 103 (e.g. photovoltaic solar panels) and wind turbines. The different types of power generating units 101 may also include fossil based power production units, e.g. diesel engines. According to an embodiment, at least one of the power producing units 101 of the power plant 100 is a wind turbine. The power plant 100 may comprises at least three power generating units 101 of the same or different types, i.e. a mix, of different types of power generating units. For example, the power plant 100 may consist only of wind turbines 102 and in this case at least three wind turbines 102. In an other example, the power plant 100 comprises at least two wind turbines 102 and at least two other power generating units 101.

The power plant is connectable with an electrical power grid (not shown) for supplying power from the power generating units 101 to the electrical power grid.

The power plant 100 is controlled by a central controller 110. The central controller 110 is arranged to control power generation from the power generating units 101 according to a power plant reference Pplant_ref which defines the desired power to be supplied to the grid from the power plant 100. Furthermore, the central controller is arranged to is to dispatch Pset power set-points to the power generating units, i.e. individual power set-points to each power generating unit 101. The power set-points Pset may be determined by the central controller 110 dependent on the power plant reference Pplant_ref so that the sum of power set-points Pset corresponds to the power plant reference Pplant_ref.

The wind turbine 101 may comprise a tower and a rotor with at least one rotor blade, such as three blades. The rotor is connected to a nacelle which is mounted on top of the tower and being adapted to drive a generator situated inside the nacelle. The rotor is rotatable by action of the wind. The wind induced rotational energy of the rotor blades is transferred via a shaft to the generator. Thus, the wind turbine is capable of converting kinetic energy of the wind into mechanical energy by means of the rotor blades and, subsequently, into electric power by means of the generator. The generator may include a power converter for converting the generator AC power into a DC power and a power inverter for converting the DC power into an AC power to be injected into the electrical power grid.

The generator of the wind turbine 102, or other power generating unit 101, is controllable to produce power corresponding to the power set-point Pset provided by the central controller 110. For wind turbines, the output power may be adjusted according to the power set-point by adjusting the pitch of the rotor blades or by controlling the power converter to adjust the power production. Similar adjustment possibilities exists for other power generating units 101.

Figure 2:
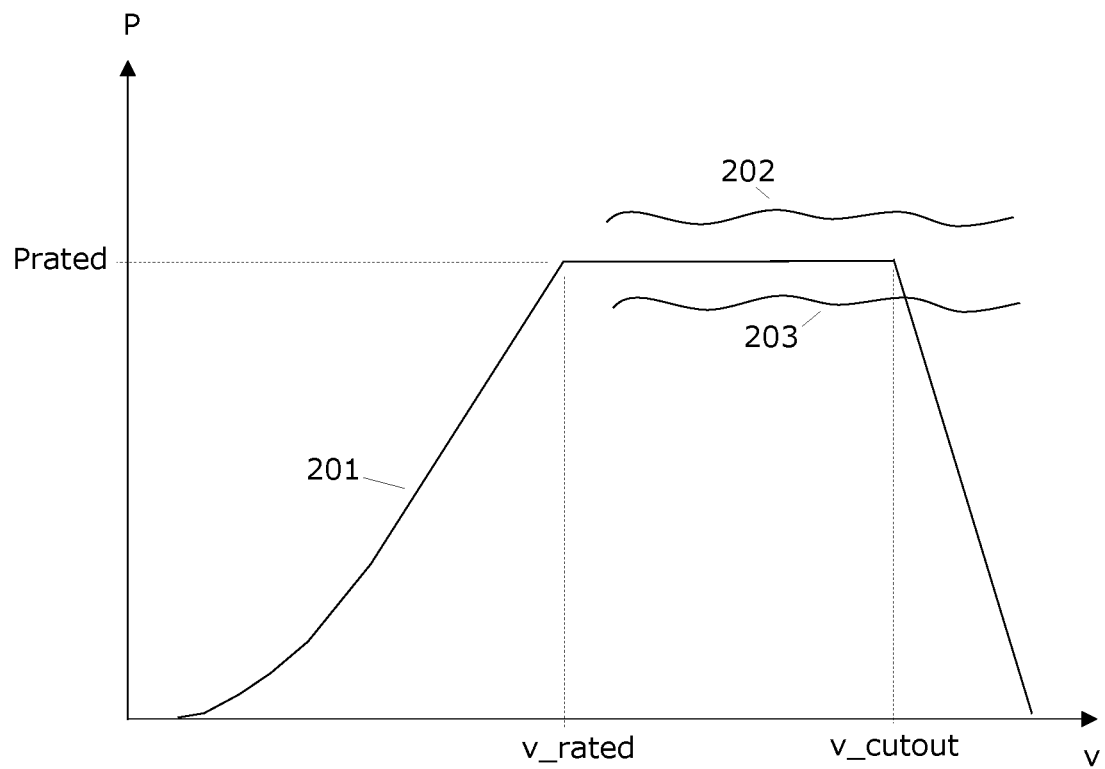
FIG. 2 illustrates a typical power production curve for the power production of a wind turbine as a function of wind speed.

FIG. 2 illustrates a typical power production curve for the power production of a wind turbine 102 as a function of wind speed v. For wind speeds below the rated wind speed v_rated, the power production increases as a function increasing wind speed. Normally, the power set-point is set as a function of wind speed and optimal pitch angle to optimize power production up to v_rated. This lower range of wind speeds is referred to as the partial load region. For wind speeds above the rated wind speed v_rated and below the cut-out wind speed v_cutout, the power production is normally limited to a maximum power production Prated. This upper range of wind speeds is referred to as the full load region. For wind speeds above the cut out wind speed, v_cutout, the wind turbine is shut down or the maximum power production is limited according to a power set-point as determined from the power curve 201.

For wind speeds above v_rated, the available power of the wind, i.e. the available wind power, may be greater than or less than the power production dictated by the power curve as illustrate by the high available power 202 and the low available power 203. At any wind speed, the available power for a given wind turbine 102 is defined as the maximum possible power output of a wind turbine under the give wind conditions. Thus, the available power will be close to the power production according to the power optimised power curve 201 of a specific turbine.

Similar power production curves may be defined for other types for power generating units 101 and, therefore, the available power definition equally applies for other types of power generating units 101.

During full load operation, the power plant reference Pplant_ref may be set to Pparkcap, i.e. the nominal power production capacity of the power plant 100, or to a value corresponding to the available power of the power plant, i.e. the maximum power production under given park conditions.

In other situations, during full load operation or other operation modes of the power generating units 201, the power plant reference Pplant_ref may be set to a value below Pparkcap or below the available power of the power plant, e.g. in order to regulate the power production so that the total power injected into the power grid matches the power demand of the grid.

In this case, all power producing units 101 could be provided with power set-points Pset so that the sum of power productions matches the power reference Pplant_ref. However, if the power reference Pplant_ref is only slightly below Pparkcap or the available power of the power plant, e.g. reduced 5% relative to Pparkcap or the available power of the power plant 100, the power producing units 101 will be operated with power set-points Pset close to the rated power Prated or the available power of the respective power generating unit 101. Controlling, e.g. a wind turbine 102 to produce power close to the available power may cause additional loads of the wind turbine, e.g. due to fluctuations of the wind speed.

A power set-point reduced below the available power is referred to as a curtailed power set point.

Similarly, a power set-point which is not reduced below the available power, e.g. a power set-point set according the to power curve 201, is referred to as a non-curtailed power set point.

Instead of curtailing all power generating units 101, a fraction or group of the power generating units 101 may be curtailed. The curtailed set-points Pset may be determined by the power plant controller 110 so that the sum of curtailed set-points Pset together with the available power of the non-curtailed power generating units meets the desired production according to the power plant reference Pref.

A power generating unit 101 being operated with a curtailed power set-point Pset_cur is controlled to deliver the curtailed power set-point Pset and is referred to as a controlled power generating unit 101, i.e., as a power generating unit operated in a controlled mode with a curtailed power set-point.

A power generating unit 101 being operated with a non-curtailed power set-point Pset_noncur is controlled to generate power according to the available power, normally only up to the non-curtailed power set-point Pset_noncur. Accordingly, the generated power depends on the available power, e.g. the wind conditions. Such power generating units are operated in a non-controlled mode with a non-curtailed power set-point.

Figure 3:
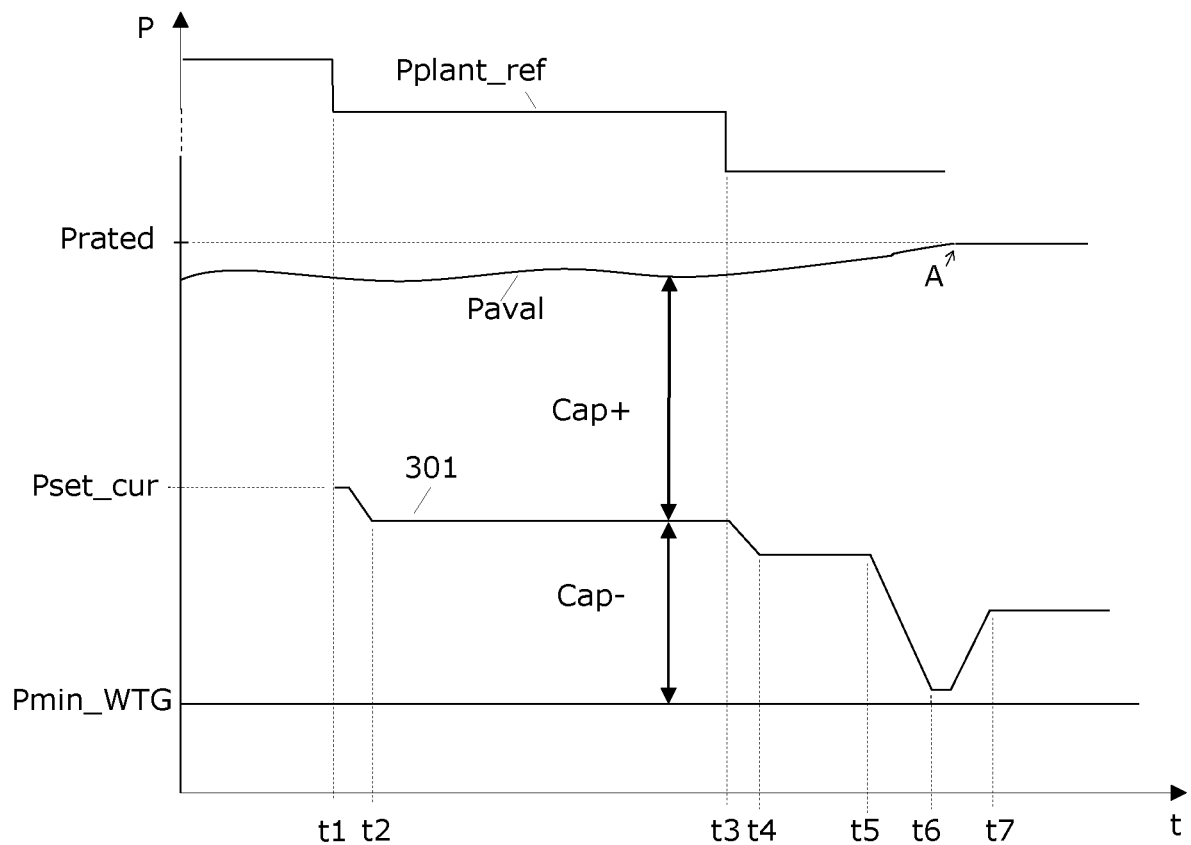
FIG. 3 illustrates power related curves for wind turbines located in the power plant.
Figure 4:
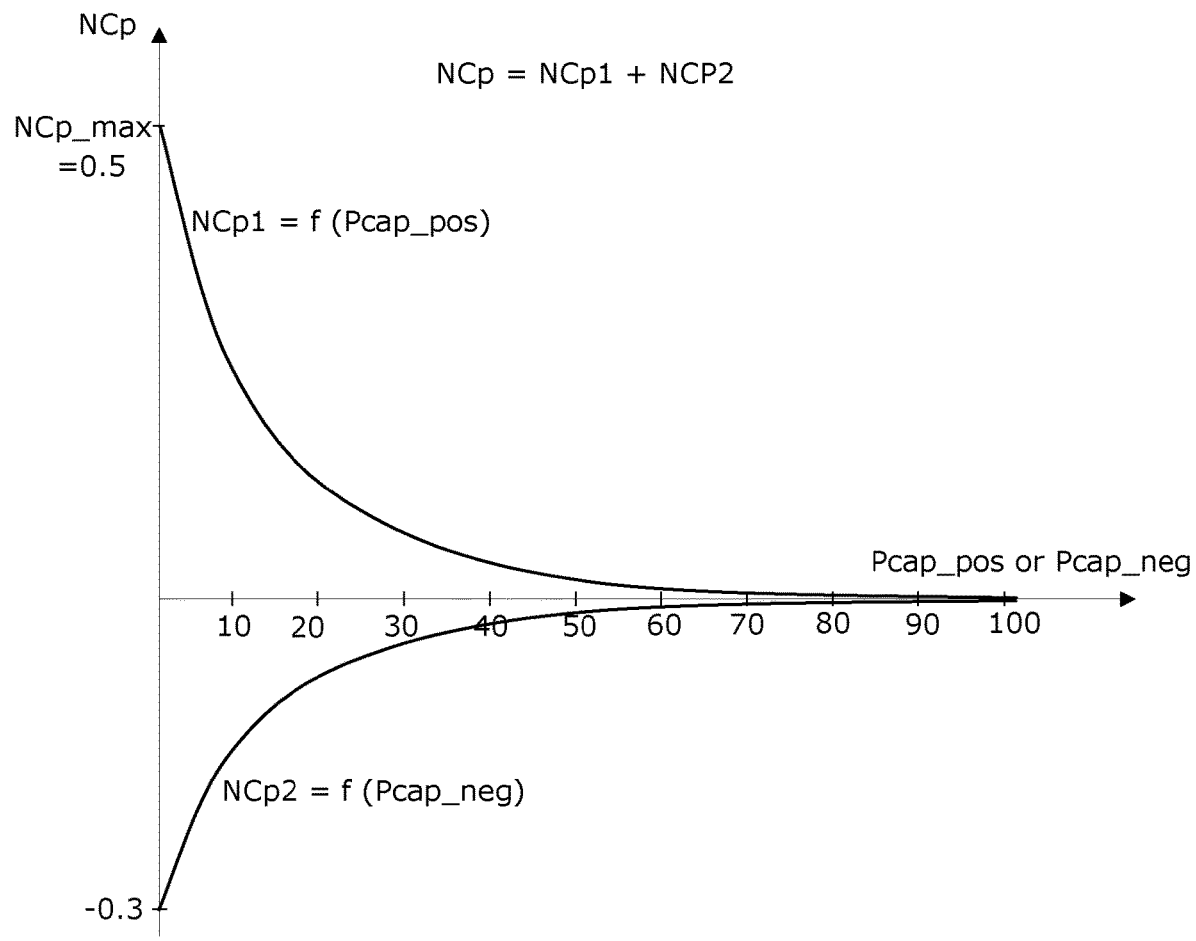
FIG. 4 illustrates a graph for deterministic determination of the number of wind turbines to be in the non-control mode.

FIG. 3 in connection with FIG. 4 illustrates the principle of an embodiment of the invention.

FIG. 3 shows various power related curves for wind turbines located in the power plant 100 and the power reference Pplant_ref for the power plant 100. It is noted that similar power related curves applies for other types of power generating units. Therefore, even though FIG. 3 and FIG. 4 are explained with reference to wind turbines, the method applies equally to other power generators in the power plant 100.

As defined above, Paval is the maximum possible power output of a wind turbine under the given wind conditions. In this example, below point A Paval is determined by available wind power, and above point A, where the available wind power is above Prated, Paval is limited to the rated power set-point Prated.

Paval may be different for different locations of wind turbines 102 the power plant 100. Here it is assumed, that Paval is high enough to enable the wind turbine to be operated at full load, i.e. where the wind speed is higher than the rated wind speed v_rated for the wind turbine.

Pplant_ref is the power reference for the power production of the entire power plant 100. Prated is the maximum power allowed to be produced by a given wind turbine under normal full load operation.

Pmin_WTG is the minimum power a single wind turbine 102 or power generating unit 101 can produce in an operational status. Accordingly, the power set point to a given wind turbine or power generating unit cannot be less than Pmin_WTG.

At t1 the park reference Pplant_ref is reduced from a power reference corresponding to the nominal production capability of the power plant 100. For example, the reduction may be 5% relative to the nominal production capability of the power plant 100.

In principle, the power set-point for the power production of all individual wind turbines of the power plant 100 could be reduced by the same 5% to meet the desired reduction of Pplant_ref. However, controlling a wind turbine in a curtailed mode close to its available power Paval may causes wear and may make power regulating of a wind turbine to a fixed power level difficult. On the other hand, curtailing a wind turbine well below its available power Paval may not a problem or may be a less of problem.

Nevertheless, a minimum number of wind turbines in the controlled group may be desirable. On the other hand, enough turbines should be in the controlled group to compensate for the power fluctuations generated by the non-controlled wind turbines. Further, enough controlled wind turbines should be available to ensure that the power plant 100 complies with external requirements such as ramp rate requirements posed by the grid operator and/or grid code.

Instead, a group of the wind turbines of the power plant 100 is set in a non-control mode where they are operated to produce the available power Paval in full load, partial load or possible in a range of wind speeds above v_cutout. For example, in full load they may operated produce the available power Paval, i.e. the rated power or the maximum available power below the rated power.

Another group of the wind turbines of the power plant 100 is set in a control mode where they are controlled according to the curtailed power setpoint Pset_cur provided by the park controller. The wind turbines in the control mode are curtailed—according to the curtailed power setpoint Pset_cur—to produce curtailed power 301 below the available power Paval. The curtailed power production 301 is in principle equal to the curtailed power setpoint Pset_cur, but deviations from the setpoint are unavoidable. Since only a fraction of the wind turbines of the power plant 100 are curtailed, i.e, operated in the control mode, the curtailed power setpoint Pset_cur is lower than the aforementioned 5% decrease relative to the rated power. Therefore, the above-mentioned problems with operating a substantial fraction of the wind turbines in the controlled mode are avoided.

The values of the curtailed power setpoints Pset_cur are determined by the central plant controller 110, e.g. so that the sum of curtailed power setpoints Pset_cur and the power production of the non-curtailed wind turbines 102 meets the desired total power production according to Pplant_ref.

In response to the reduction of Pplant_ref at t1, the curtailed power setpoint Pset_cur will be set to a value which is relatively more reduced than the reduction of Pplant_ref. The new curtailed power setpoints for the wind turbines selected to be in the control mode may be re-determined by the park controller in order to meet the total park production according to Pplant_ref.

The wind turbines selected to be in the control mode or non-control mode may be determined according to predetermined rules, e.g. so that a predetermined fraction of the wind turbines in the park is selected to be set in the control mode, e.g. dependent on the reduction in the park reference Pplant_ref. Alternatively, the wind turbines may be selected for the non-control mode operation dependent on individual wind turbine data such as power ramp rates, historical operational data such as alarm logs, accumulated loads, remaining WTG lifetime, etc. For example, in order to meet power ramp rates set by the grid operator, wind turbines may be selected according to their individual available ramp rates so that the operator's power ramp rate requirement is satisfied. Power ramp rates may specify requirements to the minimum rate-of-change of generated power in case of requested changes in the power reference Pplant_ref.

As the park power reference Pplant_ref changes, or other conditions of the power plant 100 such as wind conditions and operational status, e.g. faults of individual wind turbines, changes the number of wind turbines in the control mode may need to be changed. This may lead to unnecessary and non-deterministic changes in the number of wind turbines in the control mode.

FIG. 4 shows a graph for deterministic determination of the number of wind turbines to be in the non-control mode—and consequently in the control mode—as a function of the total positive power capability Pcap_pos or the total negative power capability Pcap_neg. The positive power capability Cap+ of a single power generating unit is defined in FIG. 3 as the difference Paval–Pset_cur or the difference between Paval and the curtailed power production 301. The negative power capability Cap– is defined in FIG. 3 as the difference Pset_cur–Pmin_WTG.

The total positive capability Pcap_pos is given as the sum of the positive capabilities Cap+. The positive capabilities Cap+ may be determined solely for the controlled power generating units, alternatively both for the non-controlled and controlled power generating units. Normally, the positive capability Cap+ for a non-controlled unit will be zero since they are not curtailed and are running at full available power.

Similarly, the total negative capability Pcap_neg is given as the sum of the negative capabilities Cap– determined solely for the controlled power generating units, alternatively both for the non-controlled and controlled power generating units.

The proportion, ratio or percentage NCp of the wind turbines which should be in the non-control mode may be defined as the ratio of 1) wind turbines which should be in the control mode and 2) wind turbines which should be in the non-control mode.

NCp may be given as F1:NCp=NCp1, alternatively as the function F2:NCp=NCp1+NCp2, The term NCp1 is given as a function of Pcap_pos, whereas the term NCp2 is given as a function of Pcap_neg as illustrated in FIG. 4.

As an example, NCp1 may be given by NCp1=NCp_max exp(–kx) and NCp2 may be given as –0.2 exp(–ky), where NCp_max is the maximum percentage of controlled power generating units 101, k is an aggressiveness factor, x is the total positive capability Pcap_pos and y is the total negative capability Pcap_neg.

The function F1 or F2 is defined, e.g. empirically, so that the determined proportion NCp provides an ideal or at least optimized proportion between controlled and non-controlled units.

According to NCp1, as Pcap_pos decreases, i.e. as Pset_cur approaches Paval, the more wind turbines should be set to the control mode—subject to the constraint of the limit NCp_max of the proportion of control vs. non-control. For example, a maximum for the NCp ratio is set to NCR_max=0.5. As Pset_cur distances from Paval, more wind turbines can be moved from the group of controlled wind turbines to the group of non-controlled wind turbines.

In order to prevent operation of controlled wind turbines near Pmin_WTG, as Pcap_neg decreases (or equivalently as Pcap_pos increases towards Paval-Pmin_WTG) less wind turbines should be set to the control mode in order to increase Pset_cur.

Accordingly, the sum of NCp1 and NCp2 gives a number of wind turbines in the control mode which can be controlled with a curtailed setpoint Pset_cur which is neither too close to Paval or Pmin_WTG. Thus, according to NCp2, as Pcap_neg decreases, i.e. as Pset_cur approaches Pmin_WTG, the more wind turbines should be set to the non-control mode, i.e. the number of controlled wind turbines should be decreased in order to increase Pset_cur. As Pset_cur distances from Pmin_WTG, more wind turbines can be moved from the group of non-controlled wind turbines to the group of controlled wind turbines.

The functions NCp1 and NCp2 may be configured as tunable functions, e.g. in term of an adjustable aggressiveness parameter k, to provide a method to modify the aggressiveness of the controller, and find a balance between accuracy of the power control and reducing the fluctuation of changing power set-points—including set-points for curtailed and full load operation—to individual wind turbines.

Thus, the aggressiveness or equivalently the rate-of-change of the proportion function F1, F2 for a given variation of the total positive capability and/or the total negative capability is adjustable to provide variable changes of the proportion NCp for the given variation of the total positive capability and/or the total negative capability.

Shortly after t1, but before t2, the ideal number of wind turbines in the non-controlled (alternatively in the controlled mode) is determined according to the function NCp(Pcap_pos)=NCp1 or NCp(Pcap_pos, Pcap_neg)=NCp1+NCP2. Any changes in the number of non-controlled wind turbines is effected by gradually moving wind turbines between the groups of non-controlled and controlled wind turbines, i.e. by switching status between controlled and non-controlled, until the ideal proportion given by NCp is approached. Here the change may cause a decrease in the number of curtailed wind turbines, i.e. a decrease of controlled wind turbines. The decrease in the number of curtailed wind turbines leads, in this example, to a decrease of the curtailed power setpoint Pset_cur. Since the decrease in the number of controlled wind turbines is introduced gradually, the change in the curtailed power setpoint Pset_cur is similarly changed gradually, as illustrated by the slope of the Pset_cur curve between t1 and t2.

In general, changes in the number of non-controlled wind turbines given by the NCp function may be limited according to a rate-of-change limitation which limits the number of changes from the controlled to the non-controlled mode, or vice versa, over a given period of time.

At t3, a further reduction in the power production of the power plant 100 is requested according to the change in Pplant_ref. The reduction in Pplant_ref causes a change, here a reduction, in the curtailed power setpoint Pset_cur for the wind turbines in the control mode. The change is effectuated at t4. The change does not necessarily case a change in the NCp proportion.

At t5 a further decrease in the curtailed power setpoint Pset_cur is required, e.g. due to an increase in the power production of the non-controlled wind turbines. At t6 the further reduction is effectuated causing each of the controlled wind turbines to be operated with a power reference near the minimum Pmin_WTG. Next time a new NCp calculation is performed, an increase in the number of wind turbines in the control mode is determined (due to the impact of the NCp2 term which reduces NCp). The increase in the number of controlled wind turbines cause a desired increase in the curtailed power setpoint Pset_cur dispatched to this group of controlled wind turbines. The change in the number of controlled wind turbines and their power reference is effectuated at t7.

If the difference between the determined proportion NCp and the actual proportion (i.e. the proportion determined as the ratio of the actual number of controlled units over non-controlled units) is less than a predetermined value, the method may determine that no change between controlled and non-controlled modes should be effectuated. For example, if the determined proportion NCp indicates that less than one power generating unit or less then one half power generating unit should change control-status, no change of the control-mode may be effectuated.

A possible change of the control-mode may be subject to the constraint that the difference between the determined proportion NCp and the potential proportion resulting from the potential change of status if reduced.

The determination of which one or more of the power generating units should be exposed to the change of status of the controlled/non-controlled mode may be based an operational status or the level of the positive or negative capability Cap+, Cap− of a given power generating unit.

For example, a wind turbine may be operated non-controlled due to a fault which implies that it cannot be operated in a curtailed mode or due to a communication fault which implies that curtailed operation is not possible. Clearly, such wind turbines should not change status to a controlled mode.

A wind turbine with low wind resulting in a production less than Pmin_WTG, which means it is not controllable, could advantageously change status to non-controlled.

A wind turbine with a production close to Pmin_WTG may advantageously change status to non-controlled.

A wind turbine operated non-controlled, but which would have a low positive capability Cap+ if its status was changed to controlled, is also less attractive move to the group of controlled units, if the proportion NCp requires such a change.

A wind turbine operated controlled and which has a low positive capability Cap+ may be more attractive to move the non-controlled group than a wind turbine operated controlled with a high positive capability Cap+.

Several other rules for selection of power generating units 101 may be defined, e.g. as a function of the positive and negative capabilities.

In order to avoid a sudden replacement of wind turbines from the controlled group to the non-controlled group, or vice versa, the number of power generating units which can be exposed to a change of the control-status may be limited according a maximum number within a given period of time.

In some situations, it may be beneficial to swap power generating units between the groups of controlled units and non-controlled units. For example, in order to obtain an even distribution of the time of operating power generating units in the controlled mode, swapping may performed to operate units in the control mode alternatively.

In other situations it may be beneficial to swap a unit operating in the controlled mode with a low positive capability with a unit operating in the non-controlled mode if the non-controlled unit will have a larger positive capability after having been moved to the controlled group.

Similarly, it may be beneficial to swap a unit operating in the controlled mode with a low negative capability with a unit operating in the non-controlled mode if the non-controlled unit will have a more suitable positive or negative capability after having been moved to the controlled group.

Thus, the swapping of power generating unit 101 may be based on a determination of potential positive and/or negative capabilities of individual power generating units of one or more of the non-controlled power generating units in a potential situation where they would be operated as controlled power generating units. Thus, in an example, only when a non-controlled unit 101 would provide a more attractive negative or positive capability Cap+/Cap− as compared with the present negative or positive capability Cap+/Cap− of potential controlled unit 101, a swap is determined to be performed.

The swapping of power generating units is performed by changing status from the non-controlled mode to the controlled mode of a number of the non-controlled power generating units, and at the same time, changing status from the controlled mode to the non-controlled mode of the same number of the controlled power generating units.

The power generating units to be swapped may be selected based on an operational status, the level of the positive capabilities or the level of the negative capabilities. Thus, units 101 may be selected on basis of the same criteria as for selecting units 101 to be move between the groups of controlled and non-controlled units in order to approach the ideal proportion NCp.

During changing status of the power generating units 101 in connection with swapping, the total positive capability Pcap_pos and/or the total negative capability Pcap_neg should not change or should at least not change significantly.

In order to restrict the frequency of swapping power generating units 101, the swapping of one or more units may be limited to a maximum number for a given period of time.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc.

should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for controlling power generation of a power plant which comprises at least three power generating units including at least one wind turbine, where the power plant is connected to an electrical power grid for supplying power from the power generating units to the electrical power grid, and where the power generating units are controllable to produce power dependent on individual power set-points, the method comprising:
   operating the power generating units so that a first power generating unit of the power generating units operates in a non-controlled mode with a non-curtailed power set-point, and so that second and third power generating units of the power generating units operate in a controlled mode with a curtailed power set-point;
   determining a positive capability for both of the second power generating unit and the third power generating unit, where the positive capability is a difference between a maximum power that can be respectively produced by the second and third power generating units and a curtailed power production of the second and third power generating units;
   determining a total positive capability as a sum of at least the positive capability of the second power generating unit and the positive capability of the third power generating unit;
   determining, based on the total positive capability, an expected proportion of power generating units operating in the controlled mode to power generating units operating in the non-controlled mode; and
   based on a difference between the expected proportion and an actual proportion of power generating units operating in the controlled mode to power generating units operating in the non-controlled mode, switching a power generating unit from operating in the non-controlled mode to operating in the controlled mode, or vice versa.

2. The method of claim 1, where the method further comprises determining a positive capability of the power generating units operating in the non-controlled mode.

3. The method of claim 1, comprising:
   determining a negative capability for each power generating unit operating in the controlled mode, wherein each negative capability is a difference between a curtailed power production and a minimum power production limit of the respective power generating unit; and
   determining a total negative capability as a sum of the negative capabilities, wherein the expected proportion is determined further based on the total negative capability.

4. The method of claim 1, wherein switching the power generating unit from operating in the non-controlled mode to operating in the controlled mode or vice versa is further based on one or more of: (i) an operational status of the power generating unit, (ii) a positive capability of the power generating unit, or (iii) a negative capability of the power generating unit.

5. The method of claim 1, wherein switching the power generating unit from operating in the non-controlled mode to operating in the controlled mode, or vice versa, is restricted according to a maximum number of power generating units which can switch operating modes within a predetermined period of time.

6. The method of claim 1, wherein a rate-of-change of the expected proportion is adjustable.

7. The method of claim 1, further comprising switching a power generating unit operating in the controlled mode to operating in the non-controlled mode in response to switching a power generating unit operating in the non-controlled mode to operating in the controlled mode.

8. The method of claim 1, wherein the switched power generating unit is selected dependent on a criterion to maintain the total positive capability.

9. The method of claim 1, further comprising determining a potential positive capability of the power generating unit based on predicting an effect of switching the power generating unit from operating in the non-controlled mode to operating in the controlled mode is further based on the potential positive capability.

10. The method of claim 1, wherein switching the power generating unit from operating in the non-controlled mode to operating in the controlled mode occurs after a predetermined period of time.

11. The method of claim 1, where the power plant is connected to an electrical power grid for supplying power from the power generating units to the electrical power grid in accordance with a power plant reference, and where the power plant reference is set below an available park capacity.

12. The method of claim 1, where at least one power generating unit operating in the non-controlled mode and at least one power generating unit operating in the controlled mode are wind turbines.

13. A central controller for controlling power production of a power plant which comprises at least three power generating units including at least one wind turbine, where the power plant is connected to an electrical power grid for supplying power from the power generating units to the electrical power grid, and where at the central controller is arranged to dispatch individual power set-points to the power generating units, and where the central controller is arranged to perform an operation, comprising:
   operating a first power generating unit of the power generating units in a non-controlled mode with a non-curtailed power set-point;
   operating second and third power generating units of the power generating units in a controlled mode with a curtailed power set-point;
   determining a positive capability for both of the second power generating unit and the third power generating unit, where the positive capability is a difference between a maximum power that can be respectively produced by the second and third power generating units and a curtailed power production of the second and third power generating units;
   determining a total positive capability as a sum of at least the positive capability of the second power generating unit and the positive capability of the third power generating unit;
   determining, based on the total positive capability, an expected proportion of power generating units operating in the controlled mode to power generating units operating in the non-controlled mode; and based on a difference between the expected proportion and an actual proportion of power generating units operating in the controlled mode to power generating units operating in the non-controlled mode, switching a power generating unit from operating in the non-controlled mode to operating in the controlled mode, or vice versa.

14. A power plant comprising at least three power generating units wherein at least one of the power generating units is a wind turbine and a central controller configured to perform an operation, the operations comprising:
 operating a first power generating unit of the power generating units in a non-controlled mode with a non-curtailed power set-point;
 operating second and third power generating units of the power generating units in a controlled mode with a curtailed power set-point;
 determining a positive capability for both of the second power generating unit and the third power generating unit, where the positive capability is a difference between a maximum power that can be respectively produced by the second and third power generating units and a curtailed power production of the second and third power generating units;
 determining a total positive capability as a sum of at least the positive capability of the second power generating unit and the positive capability of the third power generating unit;
 determining, based on the total positive capability, an expected proportion of power generating units operating in controlled mode to power generating units operating in the non-controlled mode; and
 based on a difference between the expected proportion and an actual proportion of power generating units operating in the controlled mode to power generating units operating in the non-controlled mode, switching a power generating unit from operating in the non-controlled mode to operating in the controlled mode, or vice versa.

15. A computer program product comprising non-transitory software code adapted to control a power plant when executed on a data processing system, the computer program product being adapted to perform an operation, the operation comprising:
 operating a first power generating unit of the power plant in a non-controlled mode with a non-curtailed power set-point;
 operating second and third power generating units of the plant in a controlled mode with a curtailed power set-point;
 determining a positive capability for both of the second power generating unit and the third power generating unit, where the positive capability is a difference between a maximum power that can be respectively produced by the second and third power generating units and a curtailed power production of the second and third power generating units;
 determining a total positive capability as a sum of at least the positive capability of the second power generating unit and the positive capability of the third power generating unit;
 determining, based on the total positive capability, an expected proportion of power generating units operating in the controlled mode to power generating units operating in the non-controlled mode; and
 based on a difference between the expected proportion and an actual proportion of power generating units operating in the controlled mode to power generating units operating in the non-controlled mode, switching a power generating unit from operating in the non-controlled mode to operating in the controlled mode, or vice versa.

16. The central controller of claim 13, wherein the operation further comprises determining positive capabilities of power generating units operating in the non-controlled mode.

17. The power plant of claim 14, wherein the operation further comprises determining positive capabilities of power generating units operating in the non-controlled mode.

18. The computer program product of claim 15, wherein the operation further comprises determining positive capabilities of power generating units operating in the non-controlled mode.

* * * * *